Patented Oct. 6, 1931

1,826,192

UNITED STATES PATENT OFFICE

MERWYN C. TEAGUE, OF ELMHURST, NEW YORK, ASSIGNOR TO AMERICAN RUBBER COMPANY, OF EAST CAMBRIDGE, MASSACHUSETTS, A CORPORATION OF MASSACHUSETTS

METHOD OF THICKENING AND STABILIZING LATEX AND PRODUCT

No Drawing. Application filed June 9, 1924. Serial No. 719,015.

This invention relates to a method of thickening and stabilizing latex and to the product thereof, more particularly for use in coating and extruding.

In the making of rubberized articles by a coating operation, such as by spreading or dipping, it has been common for many years to use a solution of broken-down or milled rubber in a volatile solvent to form the doughs and cements which are applied to the material to be rubberized to form a coating thereon. For extruding purposes it has been necessary to use milled rubber which has been softened sufficiently by heat and compounding to possess the desired fluidity and plasticity.

Owing to the fact that the rubber compounds used for coating must be varied to some extent in accordance with the particular purpose for which they are designed, and also owing to the fact that the compounds must be differently colored for different purposes, it is necessary to make up a considerable number of different batches in the factory. As such compounds can be most economically made up in large quantities and it is desirable to have a stock of each compound used always on hand for convenience and speed in manufacture, it has been customary to mix up such cements and doughs in large batches.

Recently there has been considerable development in the use of rubber latex as such for coating by spreading and dipping. However, as is well known, latex consists of a sensitive and easily coagulated dispersion of the rubber particles in an aqueous continuous phase, and, owing to its fluidity, it is unsuitable in its natural condition for certain coating purposes such as where it is desired to prevent impregnation of the material being coated. In addition, by reason of its fluidity it cannot be successfully used with the present types of spreader machines operating with a relatively viscous and thick dough of broken-down or milled rubber, nor can it be used for extruding purposes where a thick, plastic compound is required. By compounding the latex with certain inert fillers it is possible to obtain it in a sufficiently thickened condition to use for some coating operations, but such thickened compounds become quite sensitive to rubbing or handling and will frequently coagulate before or during use. Certain chemicals also act to thicken the latex, but after standing a few hours they render it sensitive and easily coagulated. It has also been possible by the use of certain substances such as glue or gelatine to obtain the desired thickening as well as a certain amount of stability, but in order to obtain this result it has been necessary to add these substances in such an excessive amount that undesirable properties are imparted to the finished material, such as lack of flexibility and poor ageing properties. Hence, due to this characteristics of latex it has not been practically possible prior to my invention to produce a latex thickened sufficiently for spreading and extruding and which at the same time has sufficient stability to enable it to be made up in large batches and kept for a reasonable length of time or until used.

An object of my invention is to provide a process for both thickening and stabilizing latex without coagulation thereof.

Another object is to provide a process for thickening and stabilizing latex without substantial modification of its protein content.

Still another object is to provide a process for thickening and stabilizing latex without coagulation, by chemical action, physical action, or both.

A further object is to provide a thickened and stabilized uncoagulated latex without the addition thereto of substances undesirable in themselves or imparting undesirable properties to the finished product.

For a detailed disclosure of the nature and objects of the invention reference is had to the accompanying specification and claims.

The invention consists broadly in the addition to latex of a substance or substances capable of both stabilizing the latex and thickening it to any desired degree, without coagulation thereof and without imparting undesirable properties to the finished product. The invention also comprises the product obtained.

In one manner of carrying out the invention a substance or substances are added to the latex capable of chemically reacting upon the water soluble constituents of the latex to both thicken its continuous phase and to stabilize the latex. Such a substance should be one acting almost wholly or at least preferentially upon the non-protein water soluble constituents, more particularly the inosite or latex sugar. Among some of the chemical reagents which I have found suitable for accomplishing the desired results are the following: Lead thiosulphate, basic lead acetate, lead acetate with a protective agent, litharge, lead hydroxide, the products of the reactions between lead oxides or salts and mono, di and poly-saccharoses, lead chloride, bismuth hydrate, ferric oxide, ferrous lactate, basic ferric acetate, ferrous oxalate, stannous oxalate, and cadmium sulphide.

While the above-mentioned reagents may react to a slight extent with the water soluble protein constituents it is believed that their action is chiefly with the water soluble non-protein constituents. If a relatively insoluble reagent of the character of those above specified is added without excess it appears that the reaction is practically entirely with the non-protein compounds, while with a relatively soluble reagent of the above-mentioned group it is thought that the action is not so preferential but includes some reaction with the proteins. As these proteins appear to be the protective agents normally maintaining the rubber particles in their colloidal condition, there may be in the latter case some slight local coagulation, but this coagulation is insufficient to materially and practically affect the object to be attained.

The degree and rate of thickening of the latex when treated by any of the above-mentioned materials or their equivalents depend upon a number of conditions, among which are the particular thickener and stabilizer used, the time during which it acts, and the concentration of the latex. For example, if it is desired to make a thick paste of a concentrated latex containing about 60% solids without using any inert compounding materials, this can be accomplished by adding about 3 parts of lead thiosulphate and allowing the compound to stand for two hours or more, while to appreciably thicken normal latex containing about 30% solids 10 parts of the same reagent are necessary. To produce a thickened paste from latex containing about 60% solids and litharge, about 15 parts of the latter are required and it will be necessary for the mixture to stand some 12 to 14 hours before the maximum thickening has taken place. Of the compounds mentioned in the above list those with lead appear to give the most rapid thickening action.

As an example of a thickened and stabilized latex compound for use in spreading on cloth the following is given:—

100 parts dry rubber by weight (as a concentrated latex containing about 60% rubber by weight)
90 parts whiting by weight
30 parts litharge by weight
5 parts pine oil (as 60% emulsion)
25 parts light spindle oil (as 60% emulsion)
2 parts glue by weight
2.5 parts sulphur by weight
5 parts the condensation product of acetaldehyde and aniline prepared in acid solution by weight
234 parts water (total amount including that used in latex and the emulsions)

The materials in the above compound may be mixed as follows: The whiting, litharge, sulphur and condensation product, which latter acts as an oxidation retarder, are mixed together dry, and to this mixture is added the glue in solution, and sufficient water to render the mixture of a pasty consistency. This mixture is then rendered smooth by, for instance, passing it through a paint mill, and to which is then added the remainder of the water (with the exception of that in the latex and emulsions). The pine oil and spindle oil, each having been previously emulsified in water, are now stirred into the latex, after which the filler paste is also added. The whole is then allowed to set for four hours or longer as desired. In the time stated the compound sets to a thick gel so that it can be conveniently handled with a trowel for placing before the knife on the spreading machine. In the above example the litharge is the setting or thickening and stabilizing agent and it also acts as a curing ingredient. After coating the fabric or other material with the above compound it is thoroughly dried and may then be vulcanized by placing it in a hot-air box and raising the temperature in about one-half hour to 260° F. and maintaining this temperature for about one hour. It will be noted that in the above compound latex containing about 60% solids is used. However, since considerable extra water is included in the formula, latex containing very much lower solids content can be used, or if desired latex containing a much higher solids content may be employed. The amount of water added in the compound depends upon the consistency desired in the resulting mixture. The whiting may be replaced by various other mineral compounding ingredients, and the quantity used may be varied as desired. The plastic consistency of the compounds made according to the invention does not depend primarily on the amount of pigmentation. The pine oil assists the action of the litharge in curing and can be replaced by similar emulsions of pine tar or eliminated or replaced by oils having similar properties. The spindle oil can also be varied in quantity or replaced by other softeners. While as before stated large quantities of glue may impart objectionable properties for certain purposes, it has been found that small quantities have no appreciable effect on the properties of the resulting coated goods, and in the above example a small quantity of glue has been included for increasing the body of the mixture of the compounding ingredients. It can be varied in amount over a narrow range, and replaced by corresponding quantities of similar materials or entirely omitted. The quantity of sulphur can also be varied if desired, and the oxidation retarder can be varied in amount, replaced by similar materials, or omitted.

By using the same proportions of the remaining elements given in the above example and substituting 3 parts of lead thiosulphate for the 30 parts of litharge a mixture can be obtained which will thicken in about one hour.

Another example of a latex compound thickened and stabilized by the use of lead thiosulphate is as follows:—

```
100 parts of dry rubber, by weight, (as a concentrated
      latex containing about 60% rubber by weight)
 30 parts of whiting, by weight
  3 parts of lead thiosulphate, by weight
  2 parts of pine oil (as 60% emulsion) by weight
  5 parts of light spindle oil (as 60% emulsion) by weight
  2½ parts of sulphur, by weight
  1 part the condensation product of acetaldehyde and
      aniline prepared in acid solution, by weight
  2 parts triethyl-trimethylene triamine
```

The above compound may be vulcanized in a hot air box by raising the temperature to 260° F. in one half hour and maintaining it for one hour.

In the three previously given examples 30 parts of ferric oxide or of cadmium sulphide may be substituted for the lead compounds.

As an example of a chemically thickened and stabilized latex compound, using normal latex, the following is given:

```
100 parts of dry rubber, by weight (as normal latex con-
      taining about 33% rubber by weight)
 30 parts litharge by weight
 90 parts whiting by weight
  3 parts sulphur by weight
 30 parts light spindle oil
  2 parts glue by weight
  3 parts by weight of the condensation product of acet-
      aldehyde and aniline prepared in acid solution
```

The above compound may be cured in air with one-half hour rise to 260° F. and held one hour at that temperature.

As previously pointed out, by varying the reagent used, the time allowed for action, and the concentration of the latex, compounds of any desired degree of thickening or stiffening may be obtained in accordance with the particular purpose, for which they are to be used, such as spreading or dipping. The color of the resulting rubber can also be varied by using different ones of the reagents given, or by the use of specific coloring materials. At the same time the compounds are of such stability that they may be made up in large quantity and variety for different purposes and kept for an extended period of time, many of them having been found to be still thick and in quite a stable condition after six to eight weeks.

As another modification of the invention it has been found that latex may be both thickened and stabilized by the physical action of certain materials such as ammonium or substituted ammonium soaps and saponification products. The soaps are added to the latex in sufficient quantity to produce a thickened condition, which may be accomplished by adding from 5 to 40 parts of the soap to 100 parts of rubber as latex, but I do not wish to be limited to the maximum given, as very large quantities may be added for certain purposes. While potassium or sodium soaps also have a thickening and stabilizing action the addition of large quantities of these is often objectionable by reason of the introduction of the alkali metals, but in the case of ammonium soaps and saponification products there is no such difficulty as during the drying operation after application of the latex to its purpose the ammonium compound is decomposed with evolution of ammonia gas and leaves the free aliphatic acid (or acid and glycerol as the case may be) uniformly distributed in the rubber compound. Among the ammonium soaps or saponification products suitable for use are those with stearic or similar acids of the fatty acid series, oleic and similar acids, and also the compounds with cocoanut, cotton seed, palm, linseed, and corn oils.

An example of such a thickened and stabilized latex compound suitable for spreading on fabrics is the following:

```
100  parts rubber (as 60% solids latex)
  5  parts glue
  0.6 part ultramarine blue
200  parts lithopone
 22  parts ammonium compound of cocoanut oil (dry
      basis)
  1  part zinc oxide
  3  parts sulphur
  0.5 part zinc dimethyl-dithiocarbamate
```

Another similar example is as follows:—

```
100  parts rubber (as 60% solids latex)
100  parts lithopone
 75  parts barytes
 10  parts glue
  7  parts ammonium stearate (dry basis)
  0.5 part ultramarine blue
  1  part zinc oxide
  3  parts sulphur
  0.5 part zinc dimethyl-dithiocarbamate
```

As an example of a physically thickened and stabilized latex compound, using normal latex, the following is given:

```
100  parts rubber (as normal latex containing about 33%
      rubber by weight)
 35  parts of the ammonium compound of linseed oil by
      weight
  3  parts sulphur by weight
125  parts whiting by weight
  5  parts glue by weight
  1  part zinc oxide by weight
  0.6 part ultramarine blue by weight
  0.5 part zinc dimethyl-dithiocarbamate by weight
```

The above compounds may be vulcanized in air in two hours at 212° F.

In still another form of the invention it has been found that latex may be thickened and stabilized in the presence of suitable proportions of saponin, and the following is given as an example of the use of this stabilizing agent, using 60% concentrated latex.

```
100   parts rubber by weight (as 60% solids latex)
200   parts lithopone by weight
  1   part saponin by weight
  0.5 part ultramarine blue by weight
  1   part zinc oxide by weight
  3   parts sulphur by weight
  0.5 part zinc dimethyl-dithiocarbamate
```

The above compound may be cured in air in two hours at 212° F.

It is also possible to carry out the process using two of the previously mentioned agents for thickening and stabilizing the latex, and as an example with the use of normal latex the following is given:

```
100 parts rubber by weight (as normal latex of about 33%
      solids)
  1 part saponin by weight
 15 parts lead acetate by weight
 90 parts whiting by weight
  3 parts sulphur by weight
 30 parts light spindle oil by weight
  2 parts glue by weight
  3 parts of the condensation product of acetaldehyde and
      aniline prepared in solid solution.
```

The above compound may be cured in air with one-half hour rise to 260° F. and held at this temperature for one and one-half hours. In the above formula the saponin performs a double function since it not only acts directly as a stabilizing agent, but it also acts as a protective agent for the lead acetate, which latter in the absence of such an agent has a coagulative effect on the latex. If desired 15 parts of basic lead acetate may be substituted for the lead acetate in the above formula.

It will be seen by the use of my invention a thickened and stabilized latex can be produced by the addition thereto of one or more of the agents mentioned, either one acting upon the latex physically or chemically or both, to provide a latex suitable for such purposes as extruding, spreading or dipping, without the introduction of any materials which are injurious in themselves or impart injurious properties to the finished product. Moreover, when it is not desired to use a concentrated latex the normal latex may be used instead.

In all forms of the invention a thickening and stabilizing non-protein substance is added to the latex, and in the case of the saponification and chemically acting compounds the compound is decomposed subsequently to its addition and includes a basic substance. The chemically acting compound is decomposed by its action on the latex non-protein soluble constituents, and in the case of the physically acting saponification compound it is decomposed by the removal of the volatile base when the latex is converted into rubber. In all forms of the invention a stabilized latex is obtained, and as before stated by varying the concentration of the latex, the quantity and kind of filler, the water, and the quantity and kind of stabilizing and thickening agent any desired degree of thickening may be obtained, the best results being obtained with latex containing at least about 50% total solids. Therefore by the use of my invention it is possible to make up latex compounds which will keep for considerable periods of time and the consistency of which may be varied as desired to adapt them for various purposes such as dipping, spreading, extruding, etc. My invention therefore greatly enlarges the field of use for rubber latex as such, and at the same time allows in many cases, such as the spreader machines previously mentioned, the use of the same apparatus as was formerly used with compounds prepared from milled rubber. As even a thick and viscous rubber cement contains a relatively small amount of rubber as compared with latex of very much less viscosity, it will be seen that by the use of the product of my method a relatively large quantity of rubber can when desired be applied as a coating in a single operation. Moreover the use of inflammable and expensive organic solvents is done away with, and the coating obtained from the latex is of superior strength and curing qualities and also is bonded with much greater tenacity to the fibrous or other material to which the coating is applied. Rubberized fabrics and similar materials coated with the product of my invention, or articles formed by extrusion, possess the advantages of great flexibility, good appearance, improved ageing qualities and low cost.

While specific examples of the invention have been given it is obvious that it is capable of modification and it is not desired to limit it to the particular examples given or to the specific agents described, otherwise than as defined in the appended claims.

Having thus described my invention what I claim and desire to protect by Letters Patent is:—

1. The process of treating substantially uncoagulated latex which comprises adding thereto a subsequently decomposed compound comprising a metal capable of thickening the continuous phase and stabilizing the latex without substantial modification of the colloidal condition of the rubber hydrocarbon.

2. The process of treating substantially uncoagulated latex which comprises adding thereto a subsequently decomposed compound comprising a base capable of thickening the continuous phase and stabilizing the latex without substantial modification of the colloidal condition of the rubber hydrocarbon.

3. The process of treating substantially uncoagulated latex which comprises adding thereto a compound including a base metal and oxygen capable of thickening the continuous phase and stabilizing the latex without substantial modification of the colloidal condition of the rubber hydrocarbon.

4. The process of treating substantially uncoagulated latex containing at least about 50% total solids which comprises reacting upon the aqueous portion thereof with a compound of a heavy metal adapted to thicken the continuous phase and stabilize the latex without substantial modification of the colloidal condition of the rubber hydrocarbon.

5. The process of treating substantially uncoagulated latex containing at least about 50% total solids which comprises reacting upon the aqueous portion thereof with a lead compound adapted to form a thickened stabilized uncoagulated latex.

6. The process of treating substantially uncoagulated latex containing at least about 50% total solids which comprises reacting upon the aqueous portion thereof with a relatively insoluble metallic compound adapted to form a thickened stabilized uncoagulated latex.

7. The process of treating substantially uncoagulated latex containing at least about 50% total solids which comprises reacting upon the aqueous portion thereof with a relatively insoluble lead compound adapted to form a thickened stabilized uncoagulated latex.

8. The process of treating latex which comprises reacting upon the aqueous portion thereof with lead thiosulphate to form a thickened stabilized uncoagulated latex.

9. The process of treating substantially uncoagulated latex which comprises thickening and stabilizing the latex by the addition thereto of a saponaceous substance and a metallic compound capable of acting upon the aqueous portion to thicken the same without substantially modifying the colloidal condition of the rubber hydrocarbon.

10. As a new article, a stabilized and thickened substantially uncoagulated latex containing the reaction products of a metallic compound with the aqueous portion of said latex.

11. As a new article, a stabilized and thickened substantially uncoagulated latex containing the reaction products of a heavy metal compound with the aqueous portion of said latex.

12. As a new article, a stabilized and thickened substantially uncoagulated latex containing the reaction products of a lead compound with the aqueous portion of said latex.

13. As a new article, a stabilized and thickened substantially uncoagulated latex containing the reaction products of lead thiosulphate with the aqueous portion of said latex.

14. As a new article, a substantially uncoagulated thickened and stabilized latex containing a saponaceous substance and the reaction products of a lead compound with the aqueous portion of said latex.

15. The process of treating latex which comprises thickening the continuous phase and stabilizing the latex without substantial modification of the colloidal condition of the rubber hydrocarbon by adding to the latex a substance selected from the group comprising lead thiosulphate, basic lead acetate, lead acetate with a protective agent, litharge, lead hydroxide, the reaction products of lead oxides or salts with mono, di and poly-saccharoses, lead chloride, bismuth hydrate, ferric oxide, ferrous lactate, basic ferric acetate, ferrous oxalate, stannous oxalate, cadmium sulphide.

Signed at New York, county of New York, and State of New York, this 2nd day of June, 1924.

MERWYN C. TEAGUE.